US007641385B2

(12) United States Patent
Sone et al.

(10) Patent No.: US 7,641,385 B2

(45) Date of Patent: Jan. 5, 2010

(54) HEATING APPARATUS, HEATING APPARATUS CONTROL METHOD AND NONCONTACT THERMAL SENSING DEVICE

(75) Inventors: Toshihiro Sone, Yokohama (JP); Osamu Takagi, Chofu (JP); Satoshi Kinouchi, Tokyo (JP); Yoshinori Tsueda, Fuji (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/119,035

(22) Filed: May 12, 2008

(65) Prior Publication Data

US 2008/0260399 A1 Oct. 23, 2008

Related U.S. Application Data

(62) Division of application No. 11/778,269, filed on Jul. 16, 2007, now Pat. No. 7,389,080, which is a division of application No. 11/082,242, filed on Mar. 17, 2005, now Pat. No. 7,248,808.

(51) Int. Cl.
*G01J 5/00* (2006.01)
*G01K 15/00* (2006.01)

(52) U.S. Cl. .......................... 374/133; 374/1; 374/121; 374/110; 374/132

(58) Field of Classification Search ..................... 374/1, 374/132, 133, 121
See application file for complete search history.

(56) References Cited

U.S. PATENT DOCUMENTS 5,220,389 A 6/1993 Kishimoto et al.
6,026,273 A 2/2000 Kinouchi et al.
6,078,781 A 6/2000 Takagi et al.
6,087,641 A 7/2000 Kinouchi et al.
6,097,926 A 8/2000 Takagi et al.
6,137,985 A 10/2000 Kinouchi et al.
6,154,629 A 11/2000 Kinouchi et al.

(Continued)

FOREIGN PATENT DOCUMENTS

JP 9-212033 A 8/1997

(Continued)

OTHER PUBLICATIONS

U.S. Appl. No. 10/378,859, filed Mar. 5, 2003, Sone et al.

(Continued)

*Primary Examiner*—Gail Verbitsky
(74) *Attorney, Agent, or Firm*—Foley & Lardner LLP

(57) ABSTRACT

A fixing apparatus according to one aspect of the present invention includes a non-contact temperature detecting element 81 allocated in non-contact with a heat roller, the sensing element detecting a temperature of the heat roller. The non-contact temperature sensing section 81 includes a thermopile P which detects a target temperature Pt of a heat roller 2, a temperature element CPU 100 which estimates an ambient temperature at the periphery of the thermopile P and computes an estimated ambient temperature SQt, and a thermister Q which detects an ambient temperature Qt at the periphery of the thermopile and outputs the ambient temperature Qt at an output voltage of a predetermined rate with respect to a total output voltage value corresponding to the estimated ambient temperature SQt.

10 Claims, 11 Drawing Sheets

U.S. PATENT DOCUMENTS

| | | | |
|---|---|---|---|
| 6,212,344 B1 | 4/2001 | Takagi et al. | |
| 6,337,969 B1 | 1/2002 | Takagi et al. | |
| 6,415,128 B1 | 7/2002 | Takagi et al. | |
| 6,438,335 B1 | 8/2002 | Kinouchi et al. | |
| 6,643,476 B1 | 11/2003 | Kinouchi et al. | |
| 6,643,491 B2 | 11/2003 | Kinouchi et al. | |
| 6,724,999 B2 | 4/2004 | Kikuchi et al. | |
| 6,725,000 B2 | 4/2004 | Takagi et al. | |
| 6,763,206 B2 | 7/2004 | Kinouchi et al. | |
| 6,861,627 B2 | 3/2005 | Wasai et al. | |
| 6,861,630 B2 | 3/2005 | Kinouchi et al. | |
| 6,868,249 B2 | 3/2005 | Kinouchi et al. | |
| 6,871,041 B2 | 3/2005 | Takagi et al. | |
| 6,889,018 B2 | 5/2005 | Kinouchi et al. | |
| 6,898,409 B2 | 5/2005 | Tsueda et al. | |
| 6,900,419 B2 | 5/2005 | Takagi et al. | |
| 2002/0114375 A1* | 8/2002 | Pompei | 374/133 |
| 2005/0008413 A1 | 1/2005 | Takagi et al. | |
| 2005/0031014 A1* | 2/2005 | Pompei | 374/121 |
| 2005/0199612 A1 | 9/2005 | Kikuchi et al. | |
| 2005/0205557 A1 | 9/2005 | Sone et al. | |
| 2005/0205558 A1 | 9/2005 | Kinouchi et al. | |
| 2005/0205559 A1 | 9/2005 | Kikuchi et al. | |
| 2005/0207774 A1 | 9/2005 | Sone et al. | |
| 2005/0207804 A1 | 9/2005 | Kikuchi et al. | |
| 2005/0207805 A1 | 9/2005 | Tsueda et al. | |
| 2005/0226645 A1 | 10/2005 | Sone et al. | |
| 2005/0238531 A1 | 10/2005 | Trifu et al. | |
| 2005/0265021 A1 | 12/2005 | Galvez | |
| 2006/0222048 A1* | 10/2006 | Pompei | 374/121 |
| 2007/0268952 A1* | 11/2007 | Scott | 374/1 |
| 2007/0268953 A1* | 11/2007 | Price | 374/1 |

FOREIGN PATENT DOCUMENTS

| | | |
|---|---|---|
| JP | 9-281843 A | 10/1997 |
| JP | 10-031390 A | 2/1998 |

OTHER PUBLICATIONS

U.S. Appl. No. 10/806,392, filed Mar. 23, 2004, Takagi et al.
U.S. Appl. No. 10/944,707, filed Sep. 21, 2004, Sone et al.
U.S. Appl. No. 10/944,855, filed Sep. 21, 2004, Sone et al.
U.S. Appl. No. 10/945,395, filed Sep. 21, 2004, Kinouchi et al.
U.S. Appl. No. 11/078,421, filed Mar. 14, 2005, Takagi et al.
U.S. Appl. No. 11/078,725, filed Mar. 14, 2005, Takagi et al.
U.S. Appl. No. 11/078,726, filed Mar. 14, 2005, Tsueda et al.
U.S. Appl. No. 11/080,833, filed Mar. 16, 2005, Tsueda et al.
U.S. Appl. No. 11/080,909, filed Mar. 16, 2005, Kinouchi et al.
U.S. Appl. No. 11/080,942, filed Mar. 16, 2005, Kinouchi et al.
U.S. Appl. No. 11/080,943, filed Mar. 16, 2005, Sone et al.
U.S. Appl. No. 11/082,198, filed Mar. 17, 2005, Sone et al.
U.S. Appl. No. 11/082,218, filed Mar. 17, 2005, Tsueda et al.

* cited by examiner

HEATING APPARATUS, HEATING APPARATUS CONTROL METHOD AND NONCONTACT THERMAL SENSING DEVICE

CROSS-REFERENCE TO RELATED APPLICATIONS

This application is a divisional application of U.S. application Ser. No. 11/778,269 filed Jul. 16, 2007, now U.S. Pat. No. 7,389,080, which is a divisional application of U.S. application Ser. No. 11/082,242 filed Mar. 17, 2005, now U.S. Pat. No. 7,248,808, the entire contents of which are incorporated herein by reference.

FIELD OF THE INVENTION

The present invention relates to an image forming apparatus which forms an image on a transfer material by using an electronic photography process and a heating apparatus mounted on a copying machine, a printer or the like, the heating apparatus being incorporated in a fixing apparatus for fixing a developer onto the transfer material.

DESCRIPTION OF THE RELATED ART

In copying machine or a printer using an electronic process, it is known that a toner image formed on a photosensitive drum is transferred onto a transfer material, and then, the toner image molten by a fixing apparatus including a heat roller and a pressure roller is fixed onto the transfer material.

There is known a method of detecting a surface temperature by using a detecting element brought into contact with a surface of the heat roller and controlling a temperature of the heat roller. However, there is a possibility that such a contact temperature detecting element degrades the surface of the heat roller due to sliding, and there is a problem that a service line of the heat roller is reduced. In addition, due to surface degradation, responsiveness of the detecting element may be degraded and a temperature may be incorrectly detected.

Further, it is known to use a temperature detecting element which senses a red infrared ray radiated from a heat roller and detects a temperature of the heat roller in a non-contact manner.

However, at a radiation rate of a red infrared ray from the heat roller detected by the non-contact temperature detecting element, the surface of the heat roller is gradually degraded by contact with a transfer material which holds a toner, whereby a deviation occurs at the life beginning of using the heat roller and at the life end of the heat roller. Since the degradation of the surface of the heat roller is different depending on type of a transfer material passing through paper, or size of the transfer material, a deviation occurs also in a longitudinal direction of the roller at a red infrared radiation rate. That is, a time at which a temperature detected by the non-contact temperature detecting element reaches a set temperature is delayed due to a change of the red infrared radiation.

For example, as disclosed in Jpn. Pat. Appln. KOKAI Publication No. 10-31390, there is known a technique using non-contact temperature detecting means which has self temperature detecting means to recognize a temperature T of the heat roller as a multiple order formula between a self temperature output T1 and a sensor output T0 of a non-contact temperature sensor sensed and outputted according to the self temperature and a heat roller temperature which is a non-sample, and controlling the temperature of the heat roller.

In addition, in Jpn. Pat. Appln. KOKAI Publication No. 9-281843, there is disclosed an electronic photography apparatus having a non-contact temperature sensor which senses a temperature of a heat roller in a non-contact manner and which controls the temperature of the heat roller by a sensor output of the non-contact temperature sensor. The electronic photography apparatus has means (fan) for supplying an air from a pair of image carriers to a fixing apparatus, and the non-contact sensor is allocated such that at least a part of the sensor is included in air between the fixing apparatus and the image carrier.

Further, Jpn. Pat. Appln. KOKAI Publication No. 9-212033 discloses a fixing apparatus having a self heat generation type heat roller and a temperature sensor which senses a temperature in a non-contact manner by a red infrared ray radiated by the heat roller, temperature control of the heat roller being made on the basis of an output of the temperature sensor. When a rise time from a room temperature of the heat roller to a fixing enable temperature is defined as Th, a diameter of the heat roller is defined as D cm, a maximum paper passage width of the heat roller is defined as W cm, and a response time of a fixing temperature sensor is defined as Ts, a relationship of 5 seconds$\leqq$Th$\leqq$0.23×DW seconds and 0.01Th$\leqq$Ts$\leqq$0.08Th is established.

BRIEF SUMMARY OF THE INVENTION

According to an aspect of the present invention, there is provided a heating apparatus comprising:

a heat roller which supplies a heat to sheet;

a heating device including a heating member which heats the heat roller and a first control section which controls power supplied to the heating member in order to heat the heat roller to a target temperature; and at least one non-contact temperature sensing device provided in non-contact with a surface of the heating member, the at least one non-contact temperature sensing device comprising:

- a target temperature sensing section which detects a target temperature of the heat roller;
- a second control section which estimates an ambient temperature at the periphery of the target temperature sensing section and computes an estimated ambient temperature; and
- a self temperature detecting section which detects an ambient temperature at the periphery of the target temperature sensing section and outputs the ambient temperature at an output voltage of a predetermined rate with respect to a total output voltage value which corresponds to the estimated ambient temperature.

According to another aspect of the present invention, there is provided a heating apparatus control method comprising:

heating an outer periphery face of a heat roller by utilizing a plurality of inductive heating coils allocated outside of the heat roller;

- detecting a target temperature from a target temperature detecting section provided in non-contact with the heat roller;

computing an estimated ambient temperature which is estimated as an ambient temperature at the periphery of the target temperature sensing section;

detecting an ambient temperature at the periphery of the target temperature sensing section which is outputted at an output voltage of a predetermined rate with respect to a total output voltage value which corresponds to the estimated ambient temperature;

computing a temperature of the heat roller on the basis of the target temperature and the ambient temperature; and controlling power supplied to the inductive heating coil on the basis of the temperature of the heat roller.

According to further another aspect of the present invention, there is provided a non-contact temperature sensing device comprising:

a thermopile which detects a target temperature;

a control section which estimates an ambient temperature at the periphery of the thermopile and computes an estimated ambient temperature; and a self temperature detecting section which detects an ambient temperature at the periphery of the thermopile and outputs the ambient temperature at an output voltage of a rate with respect to a total output voltage value which corresponds to the estimated ambient temperature.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an example of a fixing apparatus to which an embodiment of the present invention is applied will be described with reference to the accompanying drawings.

Figure 1:
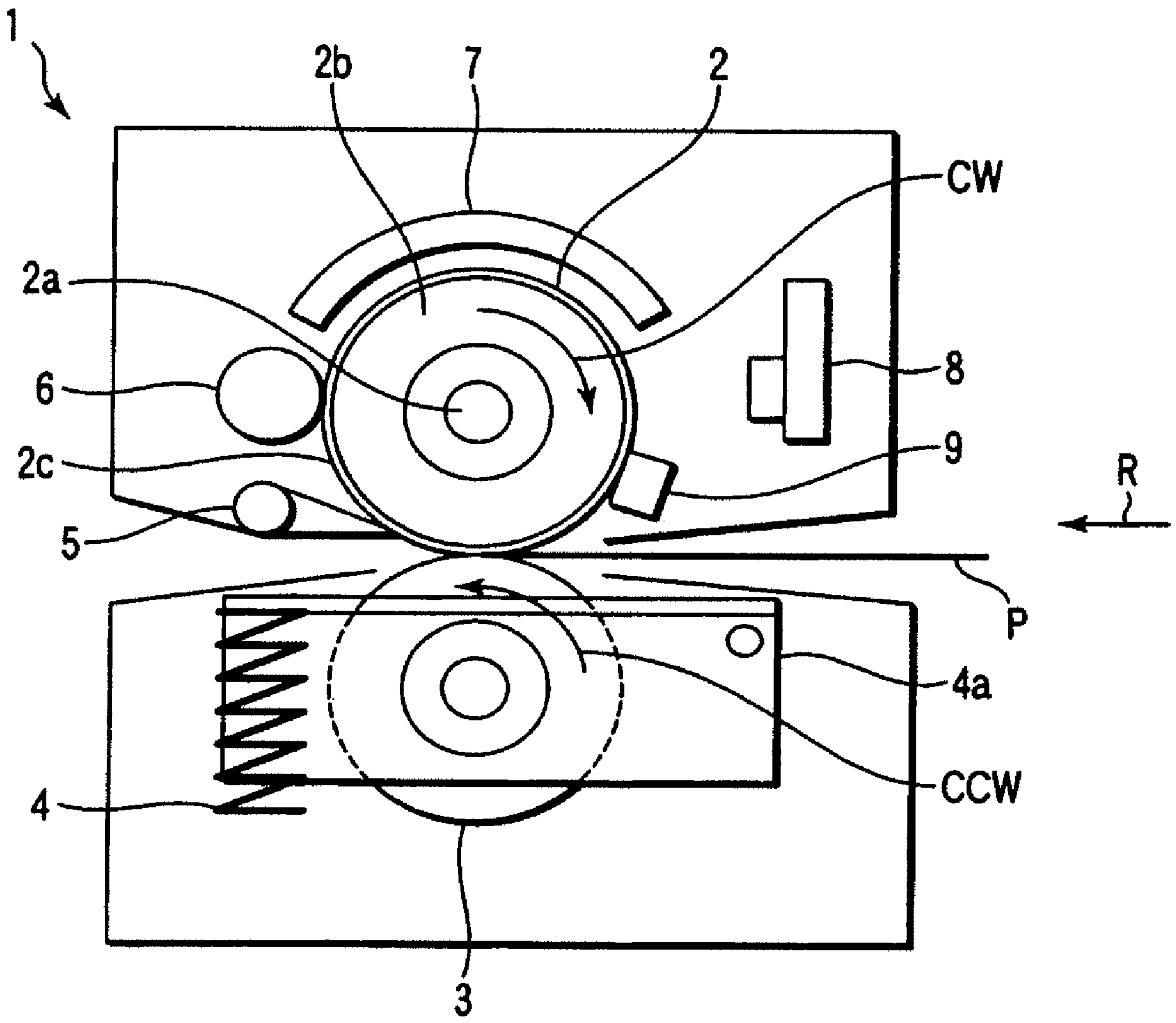
FIG. 1 is a schematic view illustrating an example of a fixing apparatus to which an embodiment of the present invention can be applied.
Figure 2:
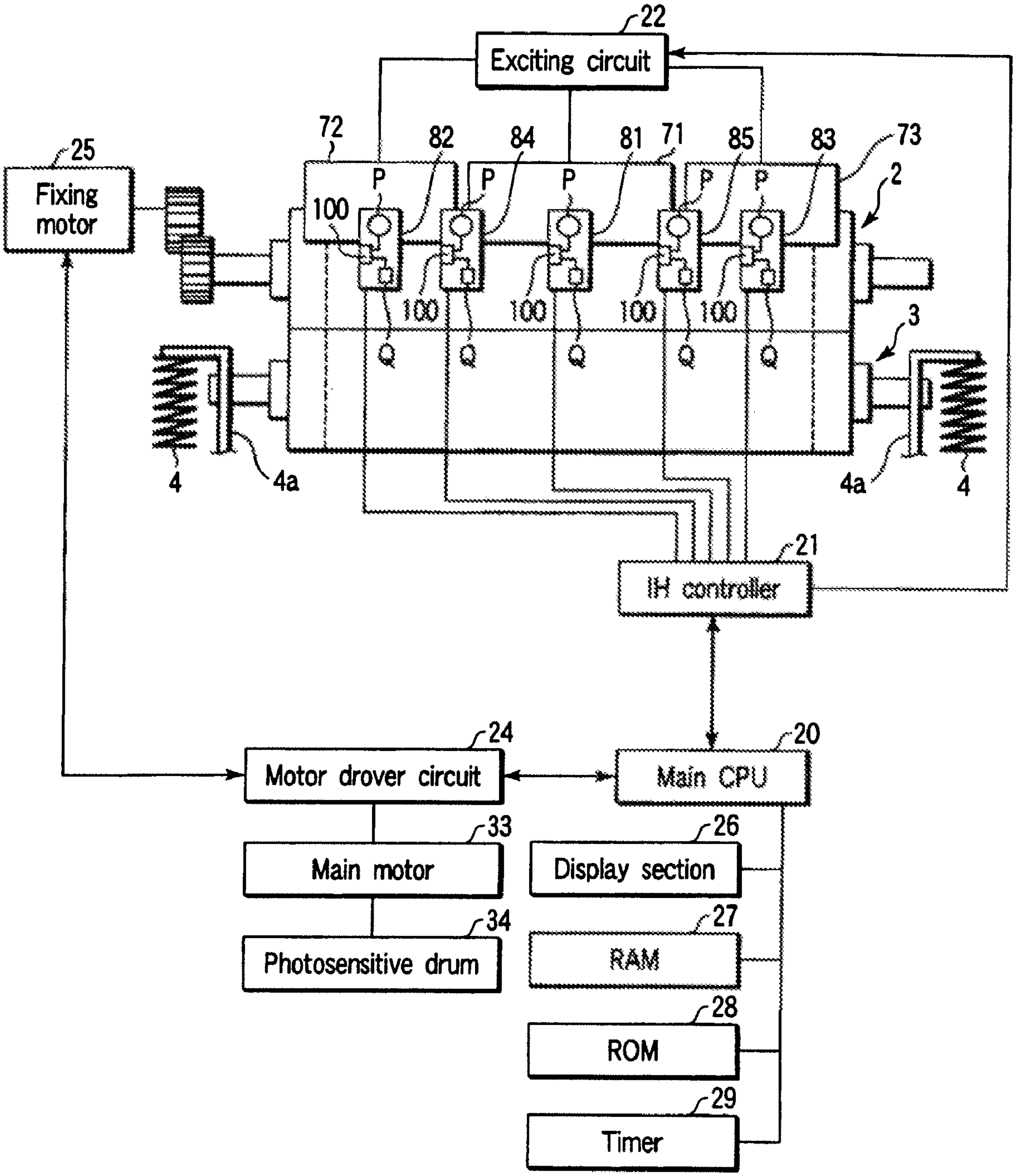
FIG. 2 is a block diagram illustrating a control system of the fixing apparatus shown in FIG. 1.

FIG. 1 shows an example of the fixing apparatus to which the embodiment of the invention is applied. FIG. 2 is a block diagram illustrating a control system of the fixing apparatus shown in FIG. 1.

As shown in FIG. 1, a fixing apparatus 1 has: a heating member (heat roller) 2; a pressure roller member (press roller) 3; a pressurizing spring 4; a release claw 5; a cleaning roller 6; an induction heating device 7; a temperature detecting mechanism 8; and a thermostat 9.

The heat roller 2 has: a shaft 2*a* composed of a material having rigidity (hardness) which is not deformed at a predetermined pressure; elastic layers 2*b* (a foam rubber layer made by foaming a silicon rubber, a sponge layer, and a silicon rubber layer) allocated in order around the shaft 2*a*; and an conductive layer (metal conductive layer) 2*c*. Although not shown, a solid rubber layer and a mold release layer made of a thin film layer such as, for example, a heat resistance silicon rubber are further formed outside of the metal conductive layer 2*c*.

It is preferable that the metal conductive layer 2*c* is formed of an electrically conducting material (such as nickel, stainless steel, aluminum, copper, and composite material of stainless steel and aluminum). It is preferable that a length in a longitudinal direction of the heat roller 2 is 330 mm.

It is preferable that the foam rubber layer 2*b* is formed to have thickness of 5 mm to 10 mm, that the metal conductive layer 2*c* is formed to have thickness of 10 μm to 100 μm, and that the solid rubber layer is formed to have thickness of 100 μm to 200 μm, respectively. In the embodiment, the foam rubber layer 2*b* is formed to have thickness of 5 mm, the metal conductive layer 2*c* is formed to have thickness of 40 μm, the solid rubber layer is formed to have thickness of 200 μm, and the mold release layer is formed to have thickness of 30 μm, respectively. The heat roller 2 is formed to have a diameter of 40 mm.

The pressure roller 3 may be provided as an elastic roller coated with a silicon rubber having a predetermined thickness or a fluorine rubber at the periphery of a rotating shaft having a predetermined diameter. In addition, like the heat roller 2, the pressure roller may be configured to have a metal conductive layer and an elastic layer.

The pressurizing spring 4 brings pressure contact with an axle of the heat roller 2 at a predetermined pressure, and the pressure roller 3 is maintained in approximately parallel to the axle of the heat roller 2. A predetermined pressure is supplied from both ends of the pressure roller 3 via a pressurizing support bracket 4*a* which supports an axis of the pressure roller 3, so that the pressurizing spring 4 can be in parallel to the heat roller 2.

In this manner, a nip having a predetermined width is formed between the heat roller 2 and the pressure roller 3.

By means of a fixing motor 25 shown in FIG. 2, the heat roller 2 is rotated in a clockwise CW direction indicated by the arrow at an approximately constant speed. The pressure roller 3 is brought into contact with the heat roller 2 at a predetermined pressure by means of the pressurizing spring 4. Thus, the heat roller 2 is rotated, whereby the pressure roller 3 is rotated in an opposite direction to a direction in which the heat roller 2 is rotated at a position which comes into contact with the heat roller 2.

The release claw 5 is positioned on the periphery of the heat roller 2, on the downstream side in a direction in which the heat roller 2 is rotated by the nip at which the heat roller 2 and the pressure roller 3 come into contact with each other, and at a predetermined position in the vicinity of the nip. The release claw 5 releases paper P passed through the nip from the heat roller 2. The present invention is not limited to the embodiment. For example, in the case where a large amount of developer is fixed onto paper, as is the case with forming a color image, the paper is hardly released from the heat roller. Thus, a plurality of release claws 5 may be provided. In addition, in the case where the paper is easily released from the heat roller, a release claw may not be provided.

The cleaning roller 6 removes dust such as toner or paper chips offset onto a surface of the heat roller 1.

The induction heating device 7 has at least one heating coil (exciting coil) allocated outside of the heat roller, wherein predetermined power is supplied to supply a predetermined magnetic field to the heat roller 2. In the embodiment, as shown in FIG. 2, the induction heating device includes: a coil 71 allocated to be opposed to a center portion in an axial direction of the heat roller 2, the coil providing a magnetic field to the center portion of the heat roller 2; and coils 72, 73 allocated to be opposed to an end portion in the axial direction of the heat roller 2, the coils each providing a magnetic field to the end portion of the heat roller 2. As described later in detail, in the coils 71 to 73, predetermined power is supplied from an exciting circuit 22, thereby making it possible to generate a magnetic field according to this power and to inductively heat the metal conductive layer 2*c* of the heat roller 2.

The temperature detecting mechanism 8 includes at least one non-contact temperature detecting element provided in non-contact with the surface of the heat roller 2, the non-contact temperature detecting element detecting a temperature on an outer periphery face of the heat roller 2 in a non-contact manner. The non-contact temperature detecting element is allocated on the downstream side in the rotation direction of the heat roller 2 more than a position at which the induction heating device 7 is allocated and on the upstream side more than the nip portion. The detecting element detects a surface temperature of the heat roller 2 heated by the induction heating device 7.

In the embodiment, the temperature detecting mechanism 8 includes non-contact temperature detecting elements 81, 82, 83, 84, 85 allocated in order in the longitudinal direction of the heat roller 2 as shown in FIG. 2. The non-contact temperature detecting elements 81, 82, 83 each detect a surface temperature of the heat roller 2 opposed to the coils 71, 72, 73. The non-contact temperature detecting element 84 detects a surface temperature of the heat roller 2 opposed to a joint of the coil 71 and the coil 72. The non-contact temperature detecting element 85 detects a surface temperature of the heat roller 2 opposed to a joint of the coil 71 and the coil 73.

The non-contact temperature detecting elements 81, 82, 83, 84, 85 are provided as non-contact temperature detecting elements capable of detecting temperatures of one or more sites by one element. These detecting elements each include: a thermopile (target temperature sensing section) P which detects a surface temperature of the heat roller 2; a thermister (self temperature detecting section) Q which detects an ambient temperature in the vicinity of the thermopile; and a temperature element CPU 100 connected to the thermopile and the thermister.

The thermopile P detects a target temperature Pt which is a surface temperature of the heat roller 2 allocated oppositely, and the thermister Q detects an ambient temperature Qt in the vicinity of the thermopile P. The target temperature Pt and the ambient temperature Qt each are detected at a voltage value which corresponds to a sensing temperature.

The temperature element CPU 100 computes a roller temperature based on the output voltage values of the connected thermopile and thermister.

For example, the non-contact temperature detecting element 81 and the temperature element CPU 100 each estimate a temperature which will be detected by the ambient temperature Qt on the basis of a predetermined correlation table or the like with reference to the target temperature Pt detected from the thermopile P or a state of the past heating of the heat roller 2. Hereinafter, the thus estimated ambient temperature is referred to as an estimated ambient temperature SQt. The estimated ambient temperature SQt is estimated depending on the state of the past heating of the heat roller, that is, a case in which power has been turned ON under a low temperature environment or a case in which resetting is carried out while long paper passage is in progress. In addition, the above predetermined correlation table corresponds to an inductive heating control method for heating a surface of the heat roller 2 in a short time, as in the present embodiment. That is, as in inductive heating, in the case where the surface of the heat roller 2 is heated in a short time, the target temperature Pt rapidly rises. However, the ambient temperature does not rise in response to a rise of the target temperature, and is different depending on the environment temperature or the past heating state of the heat roller. Therefore, the above predetermined correlation table is different depending on an equipment structure or performance of a non-contact temperature detecting element according to the target temperature Pt, the past heating state of the heat roller, and the like.

The temperature element CPU 100 selects a rate of an output voltage value of the ambient temperature Qt to a total output voltage on the basis of the estimated ambient temperature SQt, and detects the ambient temperature Qt. Then, the temperature element CPU 100 computes a surface temperature of the heat roller 2 based on the thus detected ambient temperature Qt and target temperature Pt, and outputs a roller surface temperature Rt1. In the embodiment, an error of about ±3° C. is allowed with respect to the estimated ambient temperature SQt.

In addition, the other non-contact temperature detecting elements 82 to 85 each have similar configuration, operation, and function and are capable of detecting roller temperatures Rt2, Rt3, Rt4, Rt5.

The thermostat 9 senses a heating abnormality indicating that a surface temperature of the heat roller 2 abnormally rises. If such a heating abnormality occurs, the thermostat is utilized in order to shut out the power supplied to a heating coil of the induction heating device 7. It is preferable that at least one or more thermostats 9 are provided in the vicinity of the surface of the heat roller 2.

Further, on the periphery of the pressure roller 3, there may be provided: a release claw for releasing paper P from the pressure roller 3 or a cleaning roller which removes the toner adhered onto the peripheral face of the pressure roller 3.

Thus, the paper P holding the toner T is passed through the nit portion formed between the heat roller 2 and the pressure roller 3, whereby the molten toner T is brought into pressure contact with the paper P, and an image is fixed.

As shown in FIG. 2, a main CPU 20 is connected to a IH controller 21, the exciting circuit 22, a motor driver circuit 24, the fixing motor 25, a display section 26, a RAM 27, a ROM 28, and a timer 29.

The main CPU 20 integrally controls a fixing operation of the fixing apparatus 1.

The IH controller 21 controls the exciting circuit 22 so that roller temperature information of the heat roller 2 detected by the non-contact temperature detecting elements 81 to 85 is inputted and predetermined power based on the temperature information or the like is supplied to the coils 71 to 73 of the induction heating device 7. In more detail, the IH controller 21 controls the temperature of the heat roller 2 to be increased uniformly in an axial direction and to a fixing temperature required for fixing, on the basis of the roller temperature information of the heat roller 2 outputted from the non-contact temperature detecting elements 81 to 85.

The exciting circuit 22 supplies predetermined power to the coils 71 to 73 in response to a control signal outputted from the IH controller 21. In this manner, each of the coils 71 to 73 generates a magnetic flux which is a predetermined heating force. This heating force is determined by a size of a magnetic flux which forms a basis for causing the heat roller 2 to generate an eddy current and a size of the power supplied to each of the coils 71 to 73. For example, in the case where paper passes through the center portion of the heat roller 2, or alternatively, in the case where predetermined power for exciting the coil 71 is outputted, and then, the paper passes through the center portion and end part of the heat roller 2, predetermined power (for example, 1300 W) for exciting the coils 71 to 73 is outputted.

The motor driver circuit 24 is connected to the fixing motor 25 which rotates the heat roller 2. The motor driver circuit may be also connected to a main motor 32 which rotates the photosensitive drum 33.

The display section 26 displays a device internal state message or a user message.

First Embodiment

Figure 3:
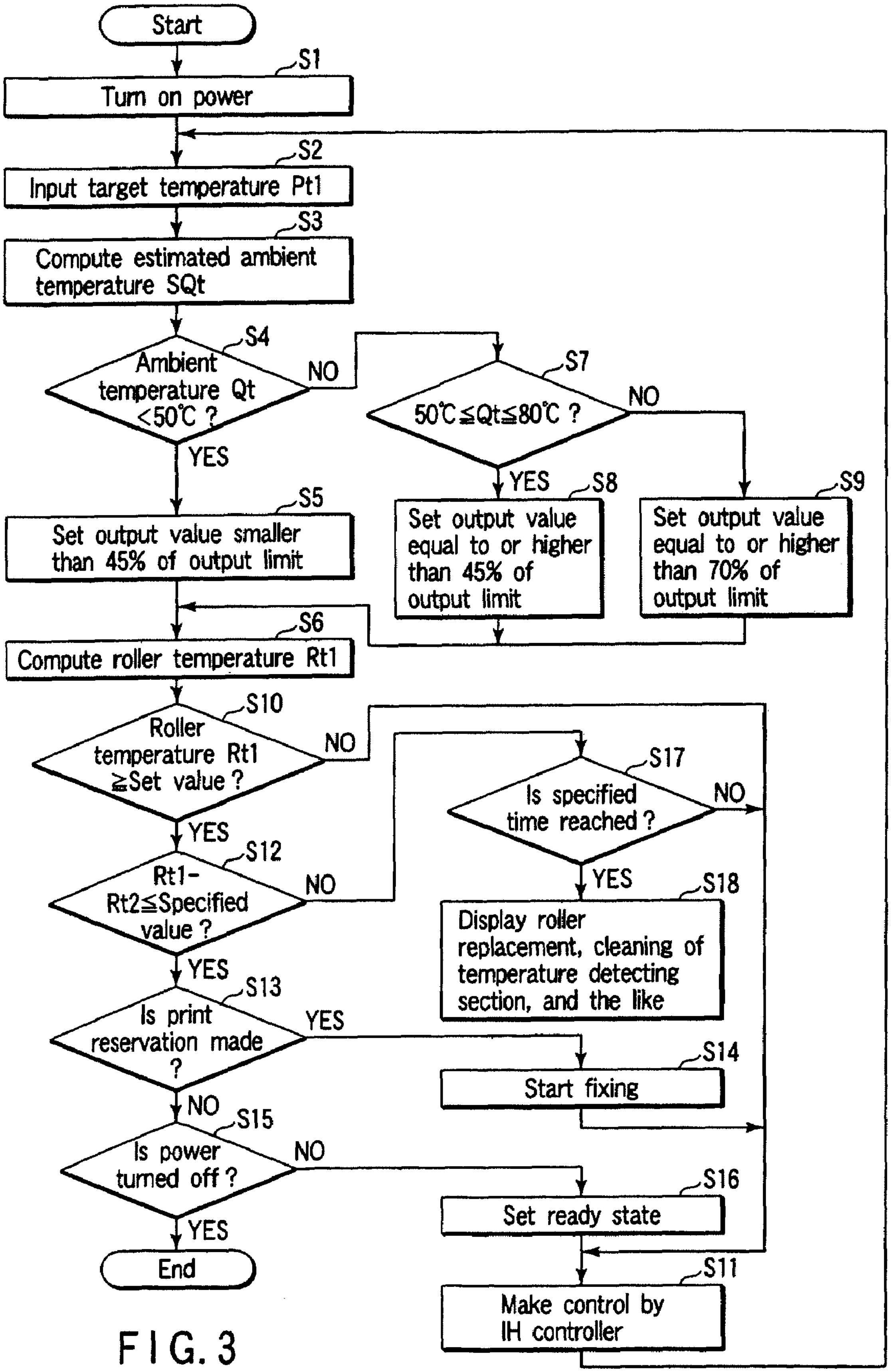
FIG. 3 is a flow chart showing an example of a heating apparatus control method which can be applied to the fixing apparatus shown in FIG. 1.
Figure 4:
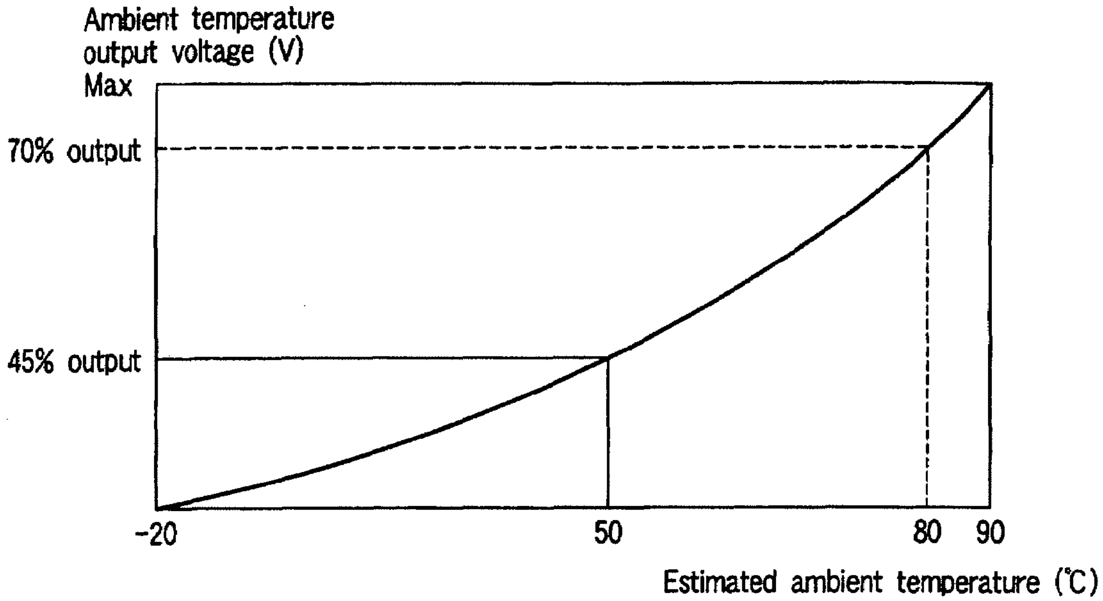
FIG. 4 is a view showing a relationship between an estimated ambient temperature and an output voltage value of an ambient temperature according to a first embodiment of the invention.

Now, an example of temperature control of the IH controller 21 will be described with reference to FIGS. 3 and 4. FIG. 3 is a flow chart showing an example of a temperature control method using the non-contact temperature detecting element 81. FIG. 4 is a view showing a relationship of an output voltage value of an estimated ambient temperature to all the output voltage values, the estimated ambient temperature being detected by the non-contact temperature detecting element according to the embodiment.

As shown in FIG. 4, for example, the non-contact temperature detecting element 81 outputs an output voltage which is 45% or higher of the total output voltage at an estimated ambient temperature of 50° C. (first temperature) or higher, and outputs an output voltage which is 70% or higher of the total output voltage at an estimated ambient temperature of 80° C. (second temperature). That is, when the target temperature Pt is a target temperature (160° C.), the non-contact temperature detecting element 81 can output a voltage obtained when an output voltage value outputted from the thermister Q is equal to or smaller than a maximum output value and is 50% or higher of the total output voltage.

In the case where the surface temperature of the heat roller 2 is the second temperature of 180° C., it is preferable that the thermister P of the non-contact temperature detecting element 81 outputs an output voltage which is at most 80% or less of the total output voltage. That is, in the case where the total output voltage of the thermister P is 1V, 0.8V is outputted.

As shown in FIG. 3, when the fixing apparatus is powered ON (S1), the IH controller 21 controls predetermined power to be supplied to the coils 71 to 73 via the exciting circuit 22. When the fixing apparatus is powered ON, power is supplied to the non-contact temperature detecting elements 81, 82, 83, 84, 85 as well to detect a target temperature and an ambient temperature.

For example, the non-contact temperature detecting element 81 detects the target temperature Pt (S2) and estimates a temperature which will be detected by the ambient temperature Qt from the detected target temperature Pt. That is, the temperature element CPU 100 computes the estimated ambient temperature SQt with reference to the predetermined correlation table (S3).

The temperature element CPU 100 determines whether or not the computed estimated ambient temperature SQt is smaller than the first temperature of 50° C. (S4). In the case where the estimated ambient temperature SQt is smaller than the first temperature of 50° C. (S4—YES), the temperature element CPU 100 detects the ambient temperature Qt of the output voltage which is smaller than 45% of the total output voltage value (output limit) (S5), and computes the roller temperature Rt1 on the basis of the target temperature Pt and ambient temperature Qt detected in step S2 (S6).

On the other hand, in the case where the estimated ambient temperature SQt is equal to or higher than the first temperature of 50° C. in step S4 (S4—NO), the temperature element CPU 100 further determines whether or not the estimated ambient temperature SQt is equal to or lower than the second temperature of 80° C. which is higher than the first temperature (S7). In the case where the estimated ambient temperature SQt is equal to or lower than the second temperature of 80° C. (S7—YES), the temperature element CPU 100 detects the ambient temperature Qt of the output voltage which is 45% or higher of the total output voltage value (output limit) (S8), and computes the roller temperature Rt on the basis of the target temperature Pt and ambient temperature Qt detected in step S2 (S6).

On the other hand, in the case where the estimated ambient temperature SQt is higher than the second temperature of 80° C., (S7—NO), the temperature element CPU 100 detects the ambient temperature Qt of the output voltage which is 70% or higher of the total output voltage value (output limit) (S9), and computes the roller temperature Rt1 on the basis of the target temperature Pt and ambient temperature Qt detected in step S2 (S6).

The thus computed roller temperature Rt1 is compared with a predetermined set value (for example, 160° C.) (S10). In the case where the roller temperature Rt1 does not reach the set value (S10—NO), temperature control is executed by means of the IH controller 21 for heating the coil 71 to the set temperature (S11). On the other hand, when the roller temperature Rt1 reaches the predetermined set value (S10—YES), the IH controller 21 determines whether or not a difference between the roller temperature Rt1 and the roller temperature Rt2 of another contact temperature detecting element 82 obtained as in the roller temperature Rt1 is within a predetermined specified value (S12).

When the difference between the roller temperature Rt1 and the roller temperature Rt2 is within the specified value (S12—YES), it is determined that the heat roller 2 has been heated uniformly in the longitudinal direction up to a set temperature value, and warming up completes. In the case where a print reservation or instruction is made after warming up has terminated (S13—YES), a fixing operation of the fixing apparatus is started (S14), and temperature controls are executed by the IH controller 21 (S11). In the case where no print reservation is made (S13—NO), it is determined whether or not power has been turned OFF (S15). In the case where power has been turned OFF (S15—YES), these temperature controls are terminated.

If the power is kept to be turned ON (S15—NO), a ready state is established (S16), and the IH controller 21 makes control so as to maintain the surface temperature of the heat roller 2 (S11). In the case where this ready mode lasts for a predetermined time or longer, temperature control in an energy saving mode can be executed.

Figure 5:
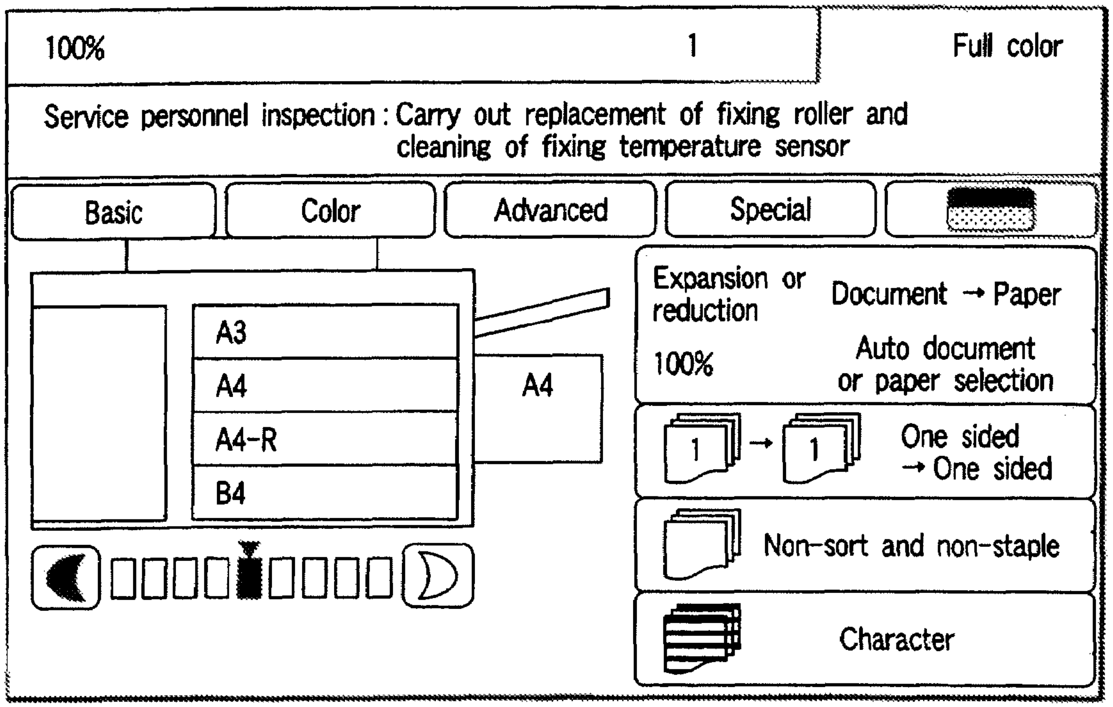
FIG. 5 is a view showing a display section which displays service personnel inspection.

On the other hand, turning to step S12, if the difference between the roller temperature Rt1 and the roller temperature Rt2 is greater than the specified value, it is determined that the temperature of the heat roller 2 is not uniform in the longitudinal direction (S12—NO). In the case where the difference between the roller temperature Rt1 and the roller temperature Tr2 does not become equal to or lower than the specified value after the specified time has elapsed (S17—YES), the main CPU determines that a problem that precise temperature detection cannot be carried out occurs because the heat roller 2 fails or the not-contact temperature detecting element is dirty. Then, the display section 26 displays "service personnel inspection" as shown in FIG. 5, and requests roller replacement or cleaning of the non-contact temperature detecting element (S18). In step S17, in the case where the specified time has not elapsed (S17—NO), temperature control is executed by the IH controller 21 for making uniform the temperature in the axial direction of the heat roller 2 (S81).

In this way, temperature control is executed using the non-contact temperature detecting element 81. The roller temperatures Rt2 to Rt5 are computed similarly in the other non-contact temperature detecting elements 82 to 85. The IH controller 21 makes temperature control of the heat roller 2 on the basis of these roller temperatures Rt2 to Rt5.

The temperature control by the IH controller 21 is provided as a control for increasing the surface temperature of the heat roller 2 uniformly in the axial direction up to the set temperature value and maintaining this set temperature value. The temperature control by the IH controller in step S11 can be made in a mode different from another one according to determination of the previous step. For example, in the case where it is determined that the roller temperature Rt1 does not read the set value in step S10, the IH controller 21 executes a control for making the temperature of the roller temperature Rt1 to the set value as during warming up. In the case where the difference between the roller temperature Rt1 and the roller temperature Rt2 is greater than the specified value in step S12, the IH controller makes control so as to heat a region in which a temperature is lower in order to make uniform the temperature in the axial direction of the heat roller 2. Further, in the case where it is determined that a ready state is established in step S16, an energy saving mode is established if a user does not supply a print instruction. Then, the set value of the surface temperature of the heat roller 2 is set at a temperature which is lower than a fixing temperature and which can be recovered in a short time, and the power supplied to the coils 71 to 73 is restricted.

Further, in the embodiment, the IH controller 21 makes control for supplying power to a coil in which the detected roller temperature is lower, thereby supplying power which is lower than power shared in the coil whose roller temperature is lower or stopping power supply. For example, in control of the coil 71 and the coil 72, the roller temperature Rt1 and the roller temperature Rt2 are compared with each other, and when the roller temperature Rt1 is lower, power is supplied to the coil 71 and power supply to the coil 72 is stopped.

The IH controller 21 can also control power supplied to the coils 71, 72 so as not to lower a temperature between the coil 71 and the coil 72 with reference to the roller temperature Rt4.

Thus, the heat roller 2 can be increased to a temperature which is uniform in the axial direction and can be maintained by the IH controller 21.

As described above, the temperature element CPU 100 can estimate a temperature which will be detected by the ambient temperature Qt on the basis of the target temperature Pt detected by the thermopile P and can select a rate of an output voltage of the ambient temperature Qt in response to the estimated ambient temperature SQt. In this manner, the thermister Q can output sufficient output power. Therefore, in the thermister Q, the non-contact temperature detecting elements 81 to 85 can detect a temperature more precisely because a difference in output voltage broadens in response to a temperature change.

In addition, in the embodiment, when the heat roller 2 has been heated up to a target temperature (160° C.), i.e., when the estimated ambient temperature is 80° C., an output voltage of the thermister Q is 70% (i.e., 50% or higher) of the total output voltage. Thus, this thermister is effective in particular in the case where the ambient temperature rapidly changes as during warming up.

Further, the power supplied to the coils 71 to 73 is also selected according to the temperature detected by the non-contact temperature detecting elements 81 to 85, thus making it possible to utilize power with no wastefulness without excessive power being supplied to the coils 71 to 73 and to contribute to energy saving.

Namely, in the case where the ambient temperature rapidly changes as during warming up, the output voltage value detected by the thermister greatly changes concurrently. In this case, if a difference between an output voltage value of the ambient temperature of the thermister and an output voltage value of the target temperature of the thermopile is small, there has been a problem that the roller temperature of the heat roller 2 cannot be precisely measured.

However, the non-contact temperature detecting elements 81 to 85 as described above can output a sufficient output voltage as the ambient temperature Qt outputted from the thermister Q, in particular, until a fixing temperature of the heat roller 2 has reached about 180° C. Thus, even in the case where the difference in output voltage of the ambient temperature outputted from the thermister Q broadens, and then, the ambient temperature Qt rapidly changes as during warming up, the non-contact temperature detecting elements 81 to 85 can detect the surface temperature of the heat roller 2 precisely.

Figure 6:
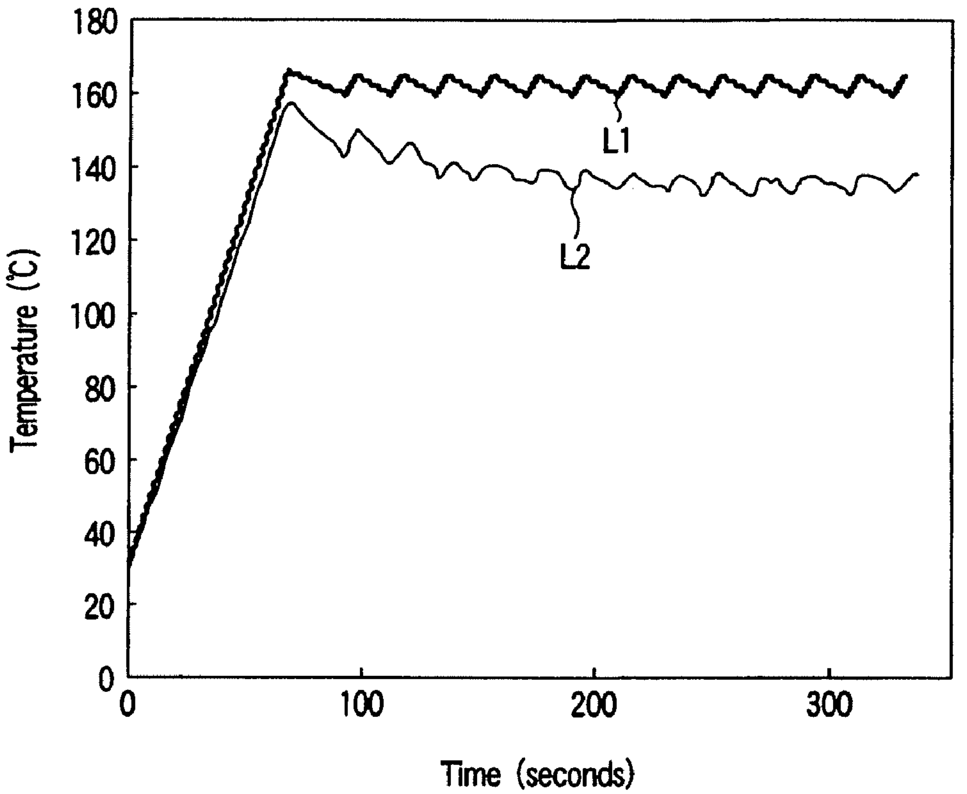
FIG. 6 is a view showing a relationship between a roller temperature of a heat roller heated by the control method shown in FIG. 3, and a time.

FIG. 6 shows a relationship between a time (horizontal axis) and a temperature (vertical axis) when the heat roller 2 has been heated by means of such temperature control. This temperature is provided as a temperature detected from the non-contact temperature detecting element when temperature control has been made such that the heat roller is heated to a predetermined temperature (160° C.). A result utilizing the temperature control according to the present invention is designated by L1, and a result of the temperature control according to a conventional method is designated by L2. The conventional temperature control method is provided as a temperature control method for computing a surface temperature of the heat roller 2 by utilizing the output voltage itself detected from the thermister and the thermopile.

As shown in FIG. 6, with respect to the result L1 of the temperature control according to the invention, when a temperature is increased to the set temperature of 160° C., the surface temperature of the heat roller 2 controlled to be turned ON/OFF in the vicinity of the temperature of 160° C. is detected as is controlled. On the other hand, with respect to the result L2 of the conventional temperature control, although the heat roller 2 has been increased to the set temperature of 160° C., the surface temperature of the heat roller 2 controlled to be turned ON/OFF in the vicinity of 140° C. which is lower than the set temperature by about 20° C. is detected. Therefore, in the conventional method, a large detection error occurs.

The invention can solve such a conventional problem and is effective in a fixing apparatus which executes feedback control based on temperature information. In addition, according to the embodiment, in the fixing apparatus utilizing IH control, a temperature rise within a short time can be achieved. Thus, according to the embodiment, an abnormal temperature rise of the heat roller 2 can be prevented by precisely detecting a temperature. Therefore, damage imparted to the heat roller is reduced, and the service life is extended.

Second Embodiment

Figure 8:
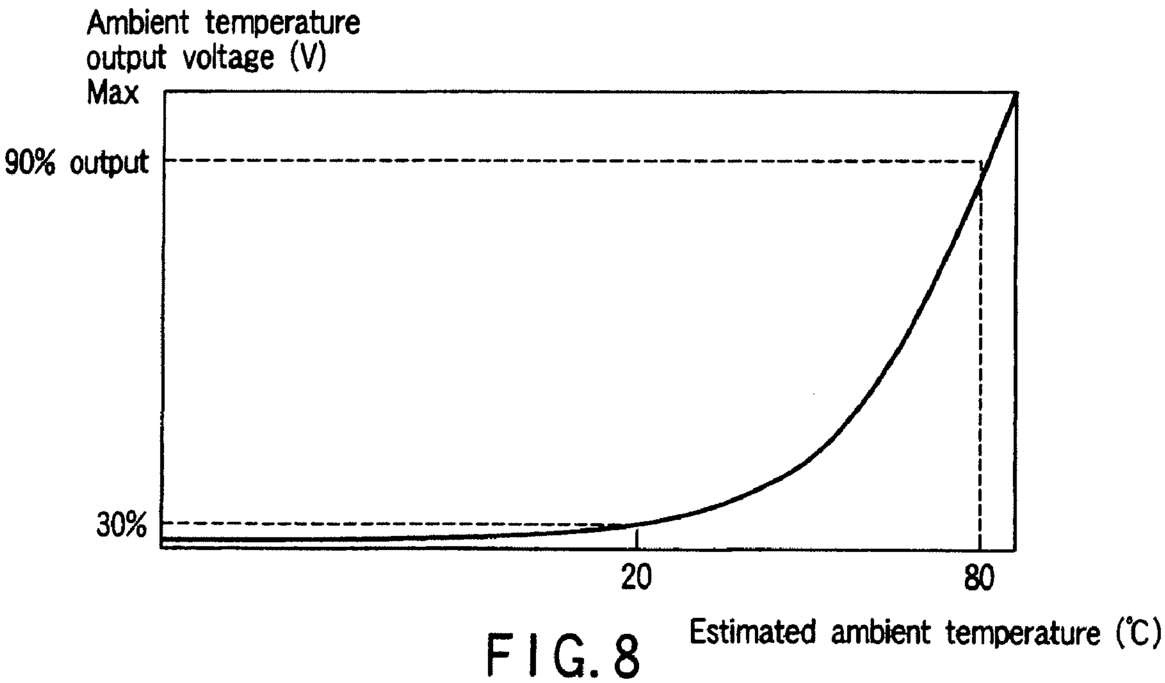
FIG. 8 is a view showing a relationship between an estimated ambient temperature and an output voltage value of an ambient temperature according to a second embodiment of the invention.
Figure 7:
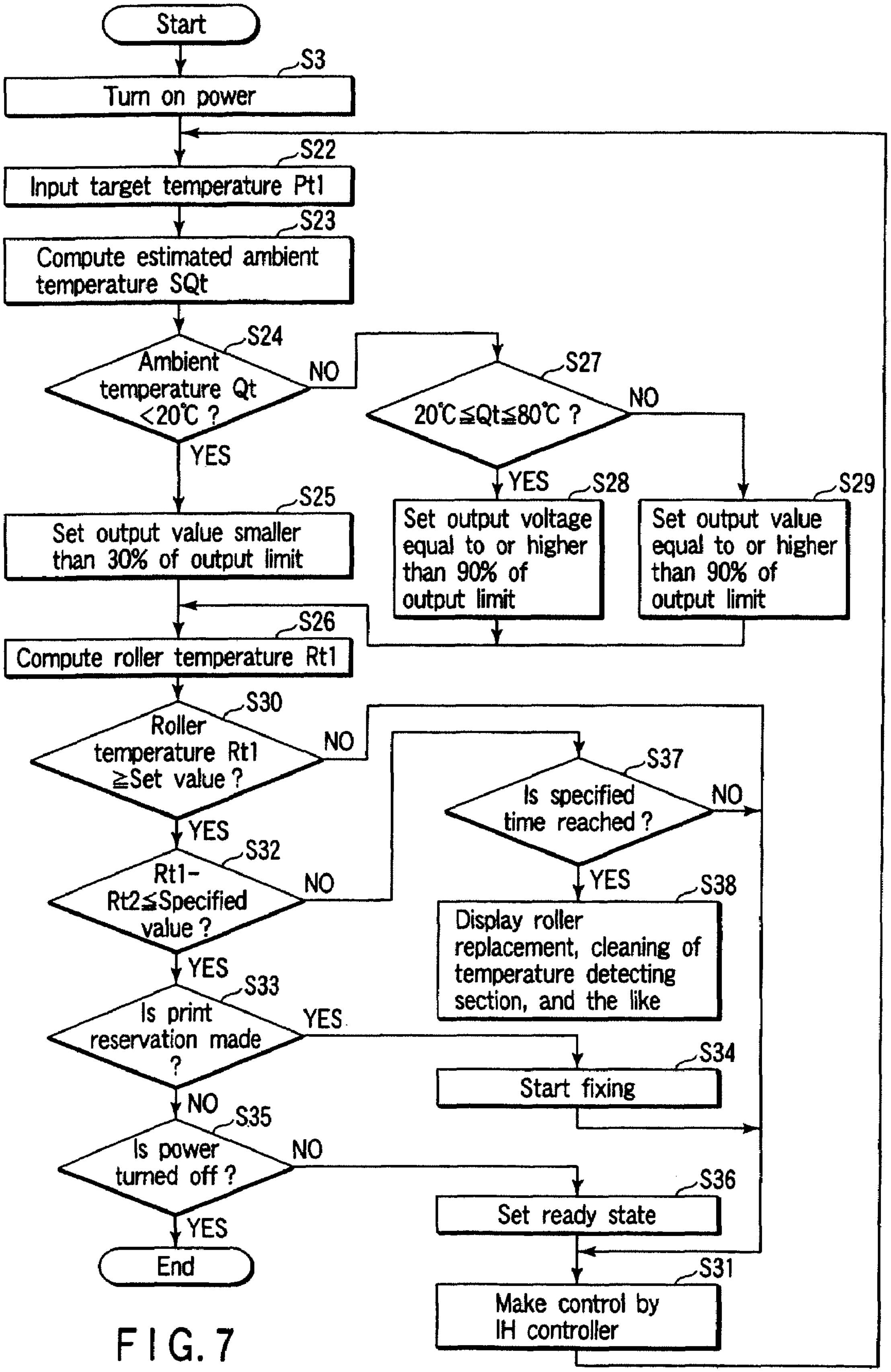
FIG. 7 is a flow chart showing another example of the heating apparatus control method which can be applied to the fixing apparatus shown in FIG. 1.

Now, another example of temperature control of the IH controller 21 will be described with reference to FIGS. 7 and 8. FIG. 7 is a flow chart showing an example of a temperature control method using the non-contact temperature detecting element 81. FIG. 8 is a view showing a relationship between an output voltage value and a total output voltage value of an estimated ambient temperature detected by a non-contact temperature detecting element according to the embodiment.

As shown in FIG. 8, for example, the non-contact temperature detecting element 81 outputs an output voltage which is 30% or higher of the total output voltage when an estimated ambient temperature is equal to or higher than 20° C. (third temperature) which is a minimum temperature when warming up completes. The detecting element also outputs an output voltage which is 90% or higher of the total output voltage at an estimated ambient temperature of 80° C. (second temperature).

That is, when a target temperature Pt is a target temperature (100° C.), the non-contact temperature detecting element 81 can output a voltage in the case where an output voltage value outputted from the thermister Q is equal to or smaller than the maximum output value and is 30% or higher of the total output voltage.

As shown in FIG. 7, when the fixing apparatus is powered ON (S21), the IH controller 21 makes control so that predetermined power is supplied to the coils 71 to 73 via the exciting circuit 22. In addition, when the fixing apparatus is powered ON, power is supplied to the non-contact temperature detecting elements 81, 82, 83, 84, 85 as well to detect a target temperature and an ambient temperature.

For example, the non-contact temperature detecting element 81 detects the target temperature Pt (S22), and estimates a temperature which will be detected by the ambient temperature Qt from the detected target temperature Pt. That is, the temperature element CPU 100 computes the estimated ambient temperature SQt with reference to the predetermined correlation table (S23).

The temperature element CPU 100 determines whether or not the computed estimated ambient temperature SQt is smaller than the third temperature of 20° C. (S24). In the case where the estimated ambient temperature SQt is smaller than the third temperature of 20° C. (S24—YES), the temperature element CPPU 100 detects the ambient temperature Qt of an output voltage which is smaller than 30% of the total output voltage value (output limit) (S25), and computes a roller temperature Rt1 based on the target temperature Pt and ambient temperature Qt detected in step S22 (S26).

On the other hand, in the case where the estimated ambient temperature SQt is equal to or higher than the third temperature of 20° C. in step S24 (S24—NO), the temperature element CPU 100 further determines whether or not the estimated ambient temperature SQt is equal to or lower than the second temperature of 80° C. which is higher than the third temperature (S27). In the case where the estimated ambient temperature SQt is equal to or lower than the second temperature of 80° C. (S27—YES), the temperature element CPU 100 detects the ambient temperature Qt of an output voltage which is equal to or higher than 30% of the total output voltage value (output limit) (S28), and computes the roller temperature Rt on the basis of the target temperature Pt and ambient temperature Qt detected in step S22 (S26).

On the other hand, in the case where the estimated ambient temperature SQt is higher than the second temperature of 80° C. (S27—NO), the temperature element CPU 100 detects the ambient temperature Qt of an output voltage which is 90% or higher of the total output voltage value (output limit) (S29), and computes the roller temperature Rt1 on the basis of the target temperature Pt and ambient temperature Qt detected in step S22 (S26).

The thus detected roller temperature Rt1 is compared with a predetermined set value (for example, 160° C.) (S30). In the case where the roller temperature Rt1 does not reach the set value (S30—NO), temperature control is executed by the IH controller 21 for heating the coil 71 to the set temperature (S31). On the other hand, if the roller temperature Rt1 reaches the predetermined set value (S30—YES), the IH controller 21 determines whether or not a difference between the roller temperature Rt1 and a roller temperature Rt2 of another non-contact temperature detecting element obtained in the same manner as when the roller temperature Rt1 is obtained is within a predetermined specified value (S32).

When the difference between the roller temperature Rt1 and the roller temperature Rt2 is within the specified value (S32—YES), it is determined that the heat roller 2 has been heated uniformly in the longitudinal direction up to the set temperature value, and warming up completes. In the case where a print reservation or instruction is made after warming up has terminated (S33—YES), a fixing operation of the fixing apparatus is started (S34), and temperature controls are executed by the IH controller 21 (S31). In the case where no print reservation is made (S33—NO), it is determined whether or not power has been turned OFF (S35). In the case where power has been turned OFF (S35—YES), these temperature controls are terminated.

If power is kept to be turned ON (S35—NO), a ready state is established (S36), and the IH controller 21 makes control so as to maintain a surface temperature of the heat roller 2 (S31). In the case where this ready state lasts for a predetermined time or longer, temperature control can be executed in an energy saving mode.

On the other hand, turning to step S12, if the difference between the roller temperature Rt1 and the roller temperature Rt2 is greater than the specified value, it is determined that the temperature of the heat roller 2 is not uniform in the longitudinal direction (S3—NO). In the case where the difference between the roller temperature Rt1 and the roller temperature Rt2 is not equal to or smaller than the specified value after a specified time has elapsed (S37—YES), the main CPU determines that there occurs a problem that precise temperature detection cannot be carried out because the heat roller 2 fails or a non-contact temperature detecting element is dirty. Then, the display section 26 displays "service personnel inspection" as shown in FIG. 5, and requests roller replacement or cleaning of the non-contact temperature detecting element (S38). In the case where the specified time has not elapsed in step S37 (S37—NO), temperature control is executed by the IH controller 21 for making uniform the temperature in the axial direction of the heat roller 2 (S31).

Figure 9:
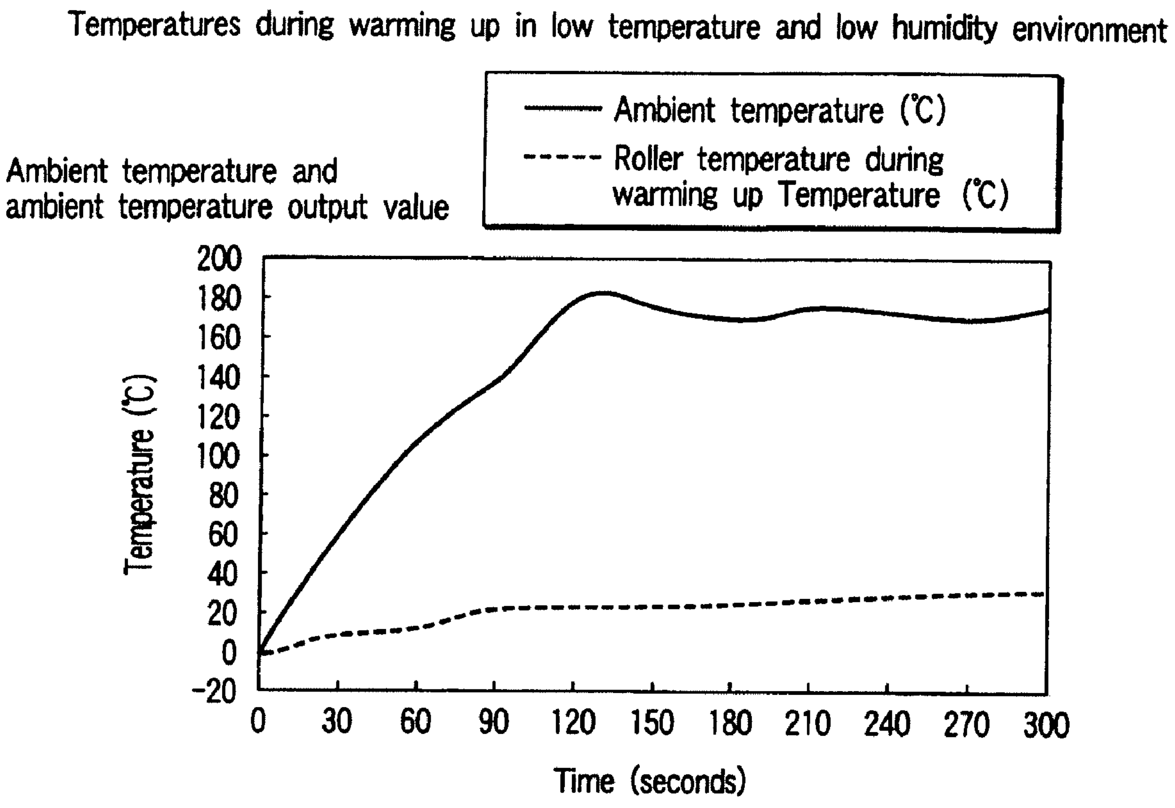
FIG. 9 is a view showing a result obtained by measuring an ambient temperature during warming up in a low tone and low humidity environment.

The above-described third temperature is provided as a minimum temperature required when warming up completes, and the third temperature has been set to 20° C. in the embodiment. Thus is because, as shown in FIG. 9, 20° C. has been set when warming up completes as a result of measuring the ambient temperature during warming up in a low tone and low humidity environment. Therefore, the ambient temperature when warming up completes reaches at least 20° C. or higher under a normal temperature environment or under a high temperature environment.

As described above, the non-contact temperature detecting elements 81 to 85 can output an ambient temperature of a sufficient output voltage value from an ambient temperature in a state in which the ambient temperature has reached the minimum temperature required when warming up completes to an ambient temperature at which the surface temperature of the heat roller 2 is heated and maintained to the fixing temperature. Consequently, the non-contact temperature detecting elements 81 to 85 can detect a temperature more precisely. Therefore, the power supplied to the coils 71 to 73 is also selected according to the temperatures detected by the non-contact temperature detecting elements 81 to 85, thus making it possible to utilize power with no wastefulness without excessive power being supplied to the coils 71 to 73 and contribute to energy saving.

Third Embodiment

Now, a still another example of the heating apparatus control method according to the invention will be described with reference to FIGS. 10 to 16.

Figure 10:
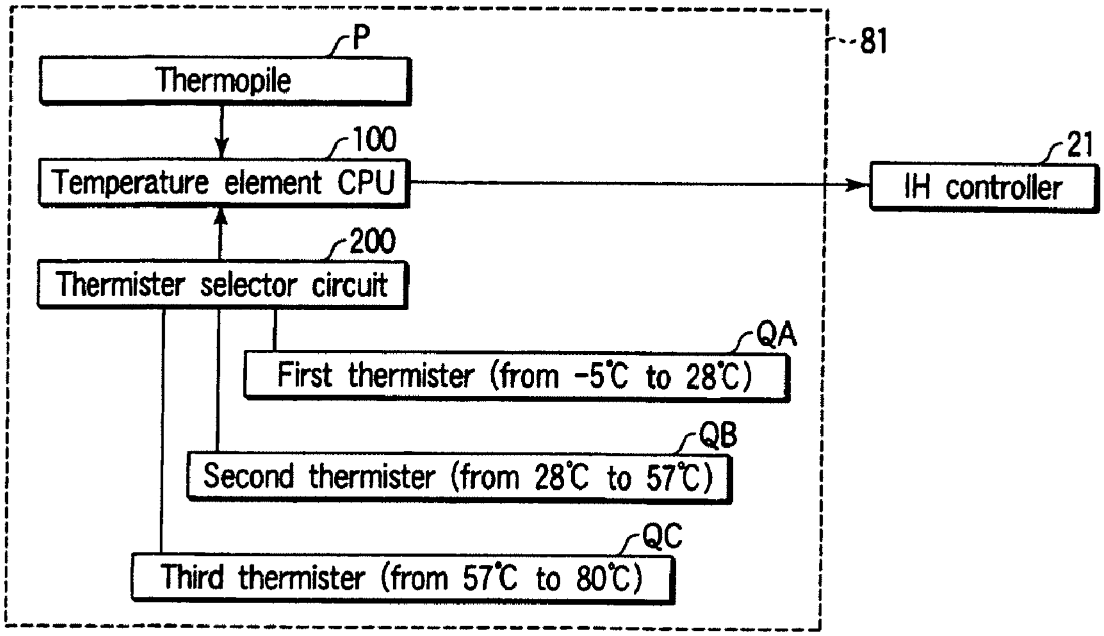
FIG. 10 is a block diagram illustrating a control system of a non-contact temperature detecting element.
Figure 11:
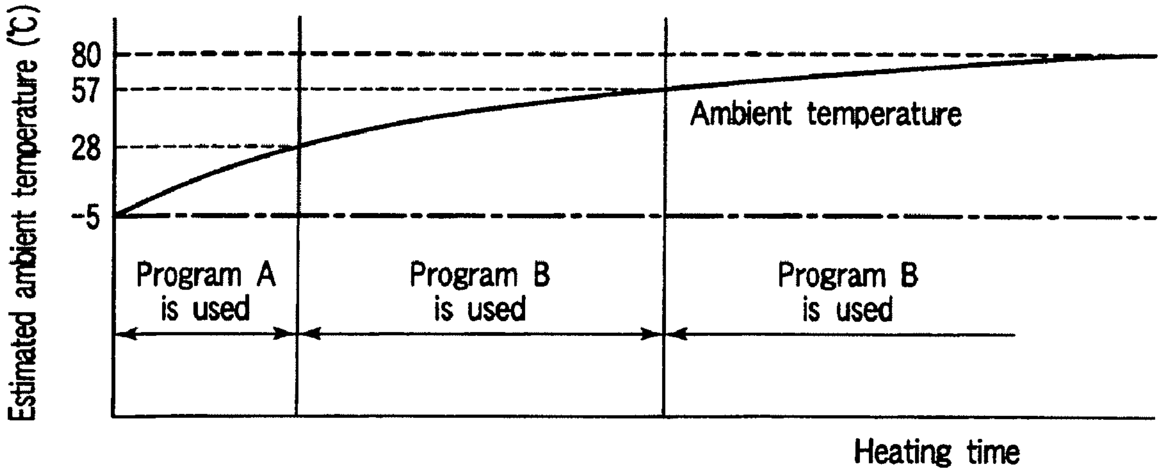
FIG. 11 is a view showing a relationship between temperature detection of an ambient temperature detecting section and program change.
Figure 12:
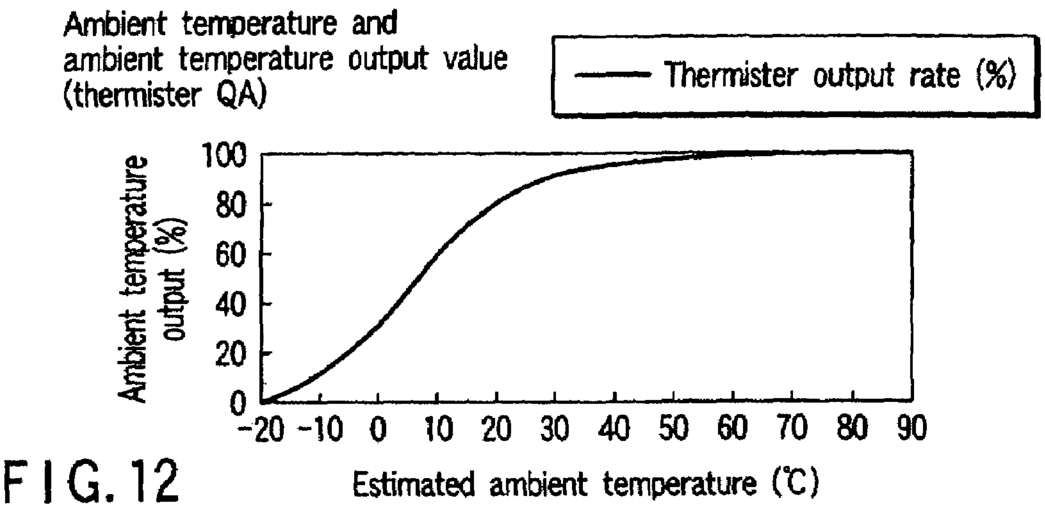
FIG. 12 is a view showing a relationship between an estimated ambient temperature and an output voltage value of an ambient temperature in a first thermister.
Figure 13:
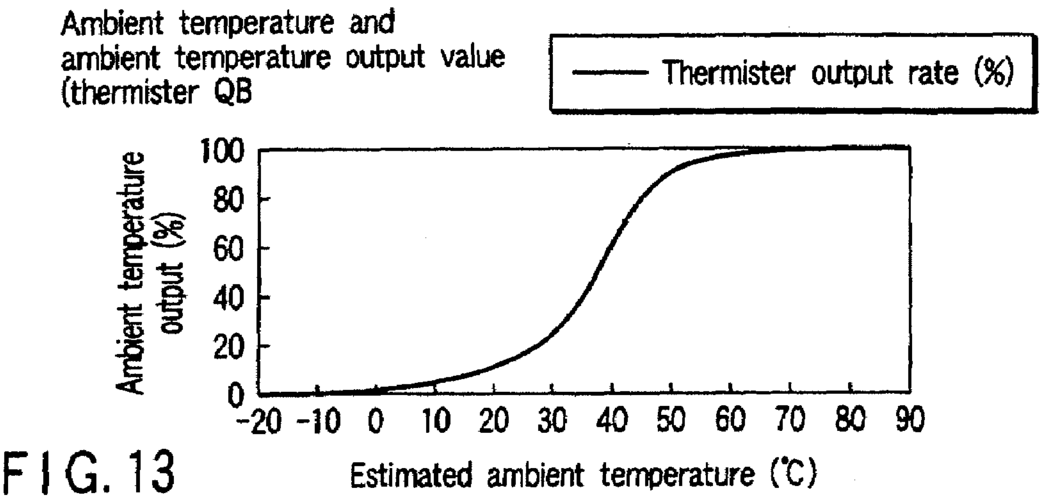
FIG. 13 is a view showing a relationship between an estimated ambient temperature and an output voltage value of an ambient temperature in a second thermister.
Figure 14:
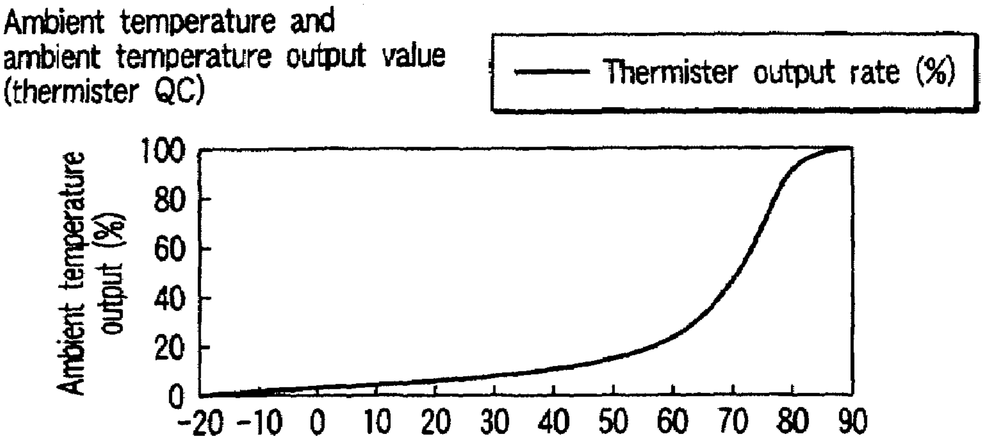
FIG. 14 is a view showing a relationship between an estimated ambient temperature and an output voltage value of an ambient temperature in a third thermister.
Figure 15:
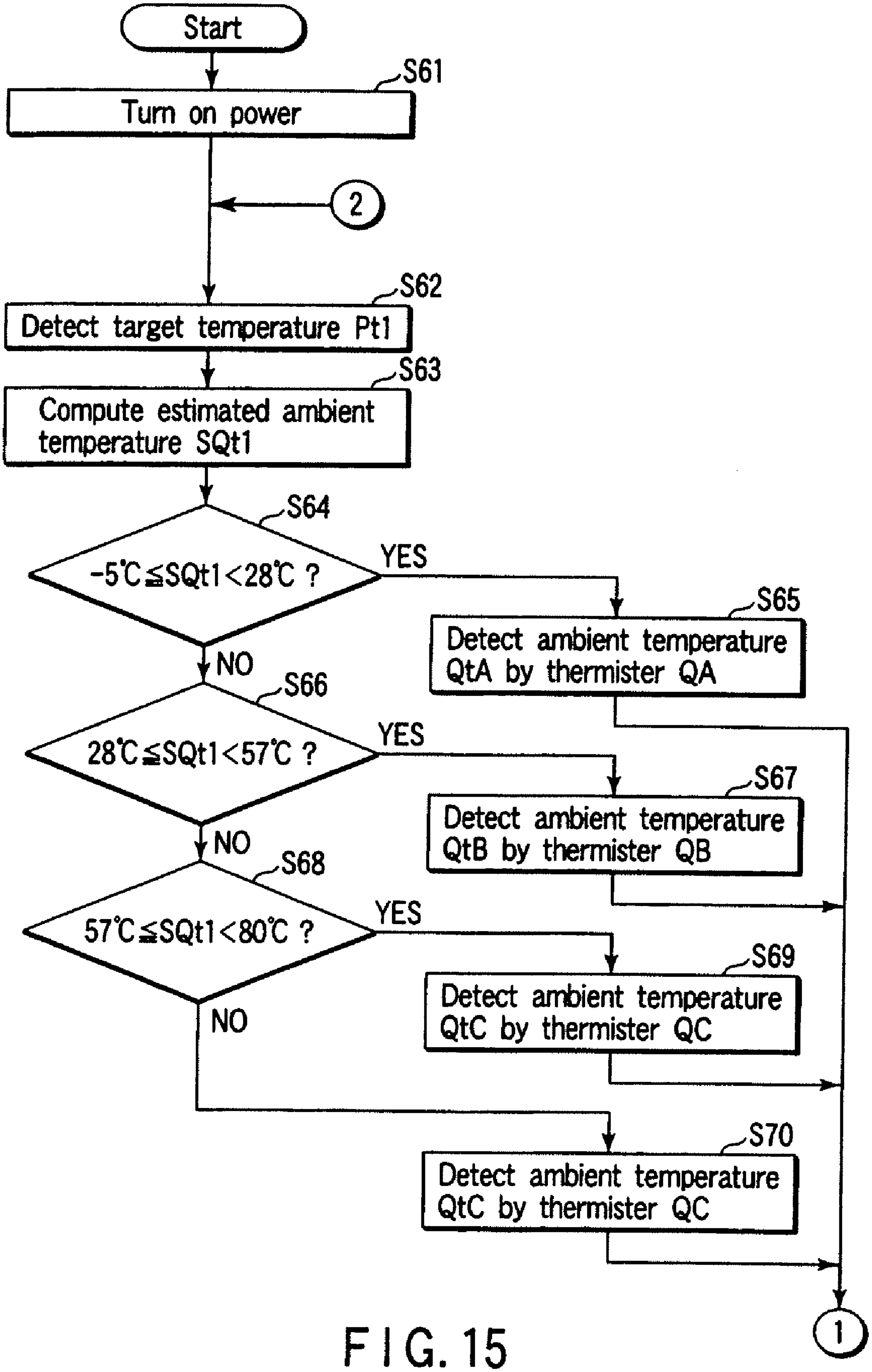
FIG. 15 is a flow chart showing still another example of the heating apparatus control method which can be applied to the fixing apparatus shown in FIG. 1.
Figure 16:
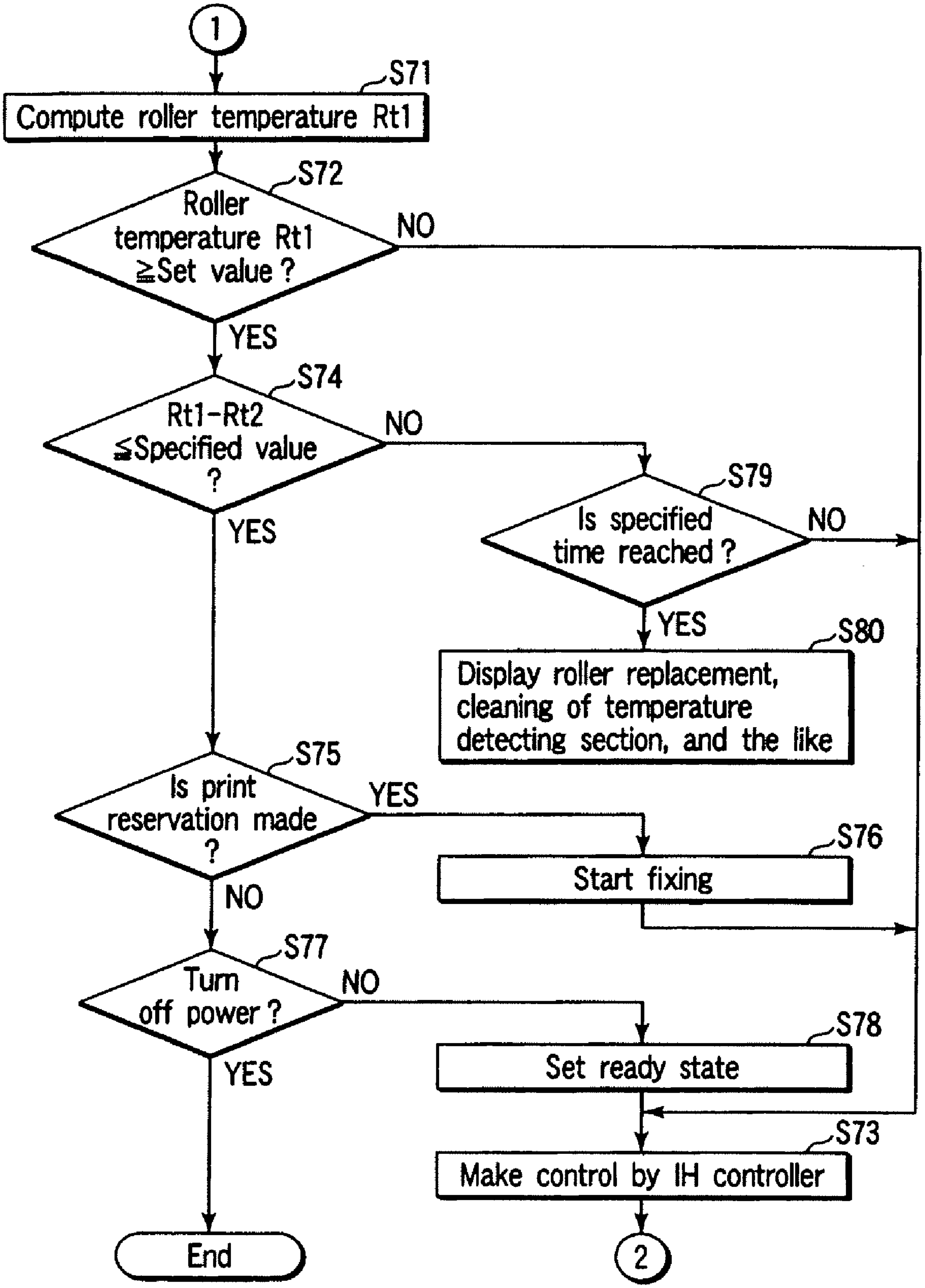
FIG. 16 is a flow chart showing a control method which follows the heating apparatus control method shown in FIG. 15.

FIG. 10 is a block diagram illustrating a control system of a non-contact temperature detecting element. FIG. 11 is a view showing a relationship between temperature detection of an ambient temperature detecting section and program change. FIG. 12 is a view showing a relationship between an output voltage value and a total output voltage value of an estimated ambient temperature in a first thermister according to the embodiment. FIG. 13 is a view showing a relationship of an output voltage value and a total output voltage value of an estimated ambient temperature in a second thermister according to the embodiment. FIG. 14 is a view showing a relationship between an output voltage value and a total output voltage value of an estimated ambient temperature of a third thermister according to the embodiment. FIGS. 15 and 16 are flow charts each showing an example of a temperature control method using the non-contact temperature detecting element 81.

As shown in FIG. 10, the non-contact temperature detecting element 81 comprises a thermopile P, a first thermister QA, a second thermister QB, a third thermister QC, a temperature element CPU 100, and a thermister selector circuit 200.

The temperature element CPU 100 is connected to the thermopile P, the thermister selector circuit 200, and the IH controller 21 to input a target temperature Pt detected by the thermopile P and ambient temperatures QtA, QtB, QtC detected by the first to third thermisters QA, QB, QC selected via the thermister selector circuit 200. The temperature element CPU 100 computes a roller temperature Rt based on these items of inputted information, and outputs the computed temperature to the IH controller 21.

Specifically, when the thermister selector circuit 200 selects the first thermister QA, a program A described later is used to output the ambient temperature QtA which is a voltage value of a rate set with respect to the total output voltage according to the ambient temperature, as described in the first and second embodiments. Similarly, when the second thermister QB is selected, a program B is used to output the ambient temperature QtB which is a voltage value of a rate set with respect to the total output value according to the ambient temperature. When the third thermister is selected, a program C is used to output the ambient temperature QtC which is a voltage value of a rate set with respect to the total output value according to the ambient temperature.

As described above, the temperature element CPU 100 can compute the estimated ambient temperature SQt with reference to the target temperature Pt detected by the thermopile P on the basis of the predetermined correlation table.

The thermister selector circuit 200 selects a self temperature detecting section for detecting an ambient temperature according to the above estimated ambient temperature SQt. In the embodiment, in the case of (A) −5° C.≦the estimated ambient temperature SQt<28° C. (first temperature range), the thermister selector circuit 200 selects the first thermister QA. In the case of (B) 28° C.≦the estimated ambient temperature SQt<57° C. (second temperature range), the selector circuit selects the second thermister QB. In the case of (C) 57° C.≦the estimated ambient temperature SQt<80° C. (third temperature range), the selector circuit selects the third thermister QC.

When the program A is used, the first thermister QA is controlled to output an output voltage which is equal to or higher than −5° C. in estimated ambient temperature SQt and which is 20% or higher of the total output voltage, as shown in FIG. 12 and to output an output voltage which is 28° C. in estimated ambient temperature SQt and which is 90% or higher of the total output voltage, by means of the temperature element CPU 100.

When the program B is used, the second thermister QB is controlled to output an output voltage which is equal to or higher than 28° C. in estimated ambient temperature SQt and which is 20% or higher of the total output voltage, as shown in FIG. 13 and to output an output voltage which is 57° C. in estimated ambient temperature SQt and which is 90% or higher of the total output voltage, by means of the temperature element CPU 100.

When the program C is used, the third thermister QC is controlled to output an output voltage which is equal to or higher than 57° C. in estimated ambient temperature SQt and which is 20% or higher of the total output voltage, as shown in FIG. 14 and to output an output voltage which is 80° C. in estimated ambient temperature SQt and which is 90% or higher of the total output voltage, by means of the temperature element CPU 100.

That is, the first to third thermisters QA, QB, QC, as described in the first and second embodiments, are controlled based on the programs A to C such that a rate of an output voltage to a total output voltage is selected according to the threshold value of the respective estimated ambient temperature SQt.

Therefore, as in the non-contact temperature detecting element according to the embodiment, a plurality of thermisters capable of outputting a sufficient output voltage are provided in association with an ambient temperature range delimited by an arbitrary threshold value, whereby a difference in output voltage according to a temperature change broadens, thus making it possible to carry out more precious temperature detection.

As shown in FIG. 15, when the fixing apparatus is powered ON (S61), the IH controller 21 makes control so as to supply predetermined power to the coils 71 to 73 via the exciting circuit 22. In addition, when the fixing apparatus is powered ON, power is supplied to non-contact temperature detecting elements 81, 82, 83, 84, 85 as well to detect a target temperature and an ambient temperature.

For example, when the thermopile P of the non-contact temperature detecting element 81 detects the target temperature Pt (S62), the temperature element CPU 100 computes the estimated ambient temperature SQt with reference to the predetermined correlation table (S63).

The temperature element CPU 100 determines whether or not the computed estimated ambient temperature SQt is within the range between −5° C. or higher and lower than 28° C. (S64). In the case where the estimated ambient temperature SQt is within the range of −5° C.≦the estimated ambient temperature SQt<28° C. (S64—YES), the thermister selector circuit 200 selects the thermister QA. The temperature element CPU 100 detects the ambient temperature QtA from the thermister QA at an output voltage of 20% or higher and lower than 90% of the total output voltage by using the program A (S65).

On the other hand, in step S64, in the case where the estimated ambient temperature SQt is not within the range of −5° C.≦the estimated ambient temperature SQt<28° C. (S65—YES), the temperature element CPU 100 determines whether or not the inputted estimated ambient temperature SQt is within the range between 28° C. or higher and lower than 57° C. (S66). In the case where the estimated ambient temperature SQt is within the range of 28° C.≦the estimated ambient temperature SQt<57° C. (S66—YES), the thermister selector circuit 200 selects the thermister QB. The temperature element CPU 100 detects the ambient temperature QtB from the thermister QB at an output voltage in the range between 20% or higher and lower than 90% of the total output voltage by using the program B (S67).

On the other hand, in the case where the estimated ambient temperature SQt is not within the range of −28° C.≦the estimated ambient temperature SQt<57° C. (S66—YES), the temperature element CPU 100 determines whether or not the inputted estimated ambient temperature SQt is within the range between 57° C. or higher and lower than 80° C. (S68). In the case where the estimated ambient temperature SQt is within the range of 57° C.≦the estimated ambient temperature SQt<80° C. (S68—YES), the thermister selector circuit 200 selects the thermister QC. The temperature element CPU 100 detects the ambient temperature QtC from the thermister QC at an output voltage in the range between 20% or higher and lower than 90% of the total output voltage by using the program C (S69).

On the other hand, in step S66, in the case where the estimated ambient temperature SQt is not within the range of −28° C.≦the estimated ambient temperature SQt<57° C. (S66—YES), the thermister selector circuit 200 selects any one of the thermister QA to QC. In the embodiment, the thermister QC is selected. The temperature element CPU 100 detects the ambient temperature QtC from the thermister QC at an output voltage which is 90% or higher of the total output voltage by using the program C (S70).

The temperature element CPU 100 computes a roller temperature Rt1 on the basis of any one of the ambient temperatures QtA to QtC detected as described above and the target temperature Pt detected in step S2 (S71).

The computed roller temperature Rt1 is compared with a predetermined set value (for example, 160° C.) (S72). In the case where the roller temperature Rt1 does not reach the set value (S72—NO), temperature control is executed by the IH controller 2 for heating the coil 71 to the set temperature (S73). On the other hand, when the roller temperature Rt1 reaches the predetermined set value (S72—YES), the IH controller 21 determines whether or not a difference between the roller temperature Rt1 and a roller temperature Rt2 of another non-contact temperature detecting element 82 obtained in the same manner as when the roller temperature Rt1 is obtained is within the predetermined specified value (S74).

When the difference between the roller temperature Rt1 and the roller temperature Rt2 is within the specified value (S74—YES), it is determined that the heat roller 2 has been heated uniformly in the longitudinal direction up to the set temperature value, and warming up completes. In the case where a print reservation or instruction is made after warming up has terminated (S75—YES), a fixing operation of the fixing apparatus is started (S76), and temperature controls are executed by the IH controller 21 (S73). In the case where no print reservation is made (S75—NO), it is determined whether or not power is turned OFF (S77). In the case where power has been turned OFF (S77—YES), these temperature controls are terminated.

If power is kept to be turned ON (S77—NO), a ready state is established (S78), and the IH controller 21 makes control so as to maintain a surface temperature of the heat roller 2 (S73). In the case where this ready state lasts for a predetermined time or longer, temperature control can be executed in an energy saving mode.

On the other hand, turning to step S74, if the difference between the roller temperature Rt1 and the roller temperature Rt2 is greater than the specified value, it is determined that the temperature of the heat roller 2 is not uniform in the longitudinal direction S74—NO). In the case where the difference between the roller temperature Rt1 and the roller temperature Rt2 is not equal to or smaller than the specified value after a specified time has elapsed (S79—YES), the main CPU determines that there occurs a problem that precise temperature detection cannot be carried out because the heat roller 2 fails or because the non-contact temperature detecting element is dirty. Then, the display section 26 displays "service personnel inspection" as shown in FIG. 5, and requests roller replacement or cleaning of the non-contact temperature detecting element (S80). In step S79, in the case where the specified time has not elapsed (S79—NO), temperature control is executed by the IH controller 21 for making uniform the temperature in the axial direction of the heat roller 2 (S73).

In this manner, temperature control is executed using the non-contact temperature detecting element 81. With respect to the other non-contact temperature detecting elements 82 to 85 as well, the roller temperatures Rt2 to Rt5 are computed similarly. The IH controller 21 makes temperature control of the heat roller 2 on the basis of these roller temperatures Rt2 to Rt5.

As described above, the non-contact temperature detecting elements 81 to 85 according to the embodiment each has the first to third thermisters capable of, in a predetermined estimated ambient temperature range (first to third temperature ranges), detecting an ambient temperature of an output voltage which is in the range between 20% or higher and lower than 90% of the total output voltage in this temperature range. In addition, the first to third temperature ranges are provided as continuous temperature ranges. A thermister selected by the thermister selector circuit 200 is switched according to the computed estimated ambient temperature, whereby the ambient temperature of an output voltage in the range between 20% or higher and lower than 90% of the total output voltage can be detected in the first to third temperature ranges. Thus, a difference in output voltage of the ambient temperature output from the thermister Q broadens, and the thermister can carry out precise temperature detection.

In step S70 shown in FIG. 15, although the thermister QC has been utilized, the present invention is not limited to this thermister. For example, a fourth thermister is further provided to output an output voltage which is equal to or higher than 80° C. in estimated ambient temperature and which is equal to or higher than 20% of a total output voltage, so that an ambient temperature may be detected by the fourth thermister.

In addition, the invention utilizing a non-contact temperature detecting mechanism can prevent an occurrence of a slide contact trace which may be formed on the surface of the heat roller 2 by the temperature detecting mechanism of contact type, and thus, the service life of the heat roller 2 can be executed.

The present invention is not limited to the above-described embodiments themselves. The invention can be embodied by modifying the constituent elements without departing from the spirit of the invention at the stage of carrying out the invention. In addition, a variety of inventions can be formed by using a proper combination of a plurality of constituent elements disclosed in the above-described embodiments. For example, some of all the constituent elements shown in the embodiments may be erased. Further, the constituent elements over the different embodiments may be properly combined with each other.

For example, the non-contact temperature detecting elements 81 to 85 may sense the surface temperature of the heat roller 2 on the downstream side in the rotation direction of the heat roller 2 more than a position at which the induction heating device 7 is allocated and on the upstream side more than the nip portion. For example, these non-contact temperature detecting elements may be configured to sense the surface temperature of the heat roller 2 between the coil and the heat roller 2, immediately after the coil, and immediately before the nip.

In addition, as described above, while the non-contact temperature detecting elements 81 to 85 have been described as constituent elements capable of detecting a temperature of one site by one element, the present invention is not limited to these detecting elements. For example, there may be used a non-contact temperature detecting element which detects temperatures of two or more sites by one element.

Further, as described above, while the non-contact temperature detecting elements 81 to 85 have been described to be allocated in a region opposed to the coil joint or the center of the coils 71 to 73, the present invention is not limited to these detecting elements. For example, these detecting elements may be allocated at both ends in the longitudinal direction of the heat roller 2, i.e., in a region opposed to the ends of the coils 72, 73. In addition, the detecting elements may be configured so as not to be allocated at the joint and so as to be allocated in a region opposed to at least the center coil 71 and in a region opposed to the end coil 72.

Furthermore, in temperature control as shown in FIG. 3, the heat roller 2 may be configured to be rotated at the same time as when power is turned ON or may be configured to be rotated after a predetermined time has elapsed.

Moreover, while the embodiment has described that a fixing temperature of the heat roller 2 is set to 180° C., the present invention is not limited to this fixing temperature. The setting can be changed according to an equipment structure, a melting point of a developer to be utilized or the like. In addition, this set value depends depending on the size, type or thickness of a recording medium. For example, when the recording medium is thick, the set value is set to be higher than usual.

In addition, while the embodiment has described a method for setting an amount of power, thereby generating a magnetic flux which is an arbitrary heating force from the coils 71 to 73, the present invention is not limited to this method. This method may be provided as a method for selecting a frequency of a flow current for the coils 71 to 73, thereby changing the heating force.

While the embodiment has described a configuration of applying a pressure from the pressure roller to the heat roller, the present invention is not limited to this configuration. This configuration may be provided as a configuration of applying a pressure from the heat roller to the pressure roller.

In addition, this configuration may be provided as a configuration of detecting the temperature of the heat roller 2 by using a sensor of contact type. Further, in the non-contact temperature detecting element 81, at least the thermopile P and the thermister Q may be allocated in the fixing apparatus. The temperature element CPU 100 or the like may be allocated outside of the fixing apparatus.

What is claimed is:

1. A non-contact temperature sensing device comprising:

a thermopile configured to detect a target temperature;

a control section configured to estimate an ambient temperature at the periphery of the thermopile and compute an estimated ambient temperature with reference to the target temperature;

a plurality of self temperature detecting sections each configured to detect an ambient temperature at the periphery of the thermopile and output the ambient temperature to the control section at an output voltage of a rate with respect to a total output voltage value which corresponds to the estimated ambient temperature; and a self temperature detecting section selector configured to switch the self temperature detecting sections according to the estimated ambient temperature.

2. The non-contact temperature sensing device according to claim 1, wherein the self temperature detecting sections include:

a first self temperature detecting section configured to output an output voltage which is 20% or higher of the total output voltage when the estimated ambient temperature is in a first temperature range; and a second self temperature detecting section configured to output an output voltage which is 20% or higher of the total output voltage when the estimated ambient temperature is within a second temperature range different from the first temperature range, wherein the self temperature detecting section selector is configured to select the first temperature detecting section when the estimated ambient temperature is within the first temperature range, or the second temperature detecting section when the estimated ambient temperature is within the second temperature range, and wherein the control section is configured to compute a temperature of a target on the basis of the output voltage of the first self temperature detecting section or the second self temperature detecting section selected by the self temperature detecting section selector, and the target temperature detected by the thermopile.

3. The non-contact temperature sensing device according to claim 1, wherein the thermopile comprises a thermopile temperature sensor configured to detect a temperature by utilizing a red infrared ray.

4. The non-contact temperature sensing device according to claim 1, wherein the self temperature detecting sections include:

a first self temperature detecting section configured to output an output voltage which is 20% or higher of the total output voltage when the estimated ambient temperature is in a first temperature range;

a second self temperature detecting section configured to output an output voltage which is 20% or higher of the total output voltage when the estimated ambient temperature is within a second temperature range different from the first temperature range; and a third self temperature detecting section configured to output an output voltage which is 20% or higher of the total output voltage when the estimated ambient temperature is within a third temperature range different from the first temperature range and the second temperature range, wherein the self temperature detecting section selector is configured to select:

the first self temperature detecting section when the estimated ambient temperature is within the first temperature range;

the second self temperature detecting section when the estimated ambient temperature is within the second temperature range; or the third self temperature detecting section when the estimated ambient temperature is within the third temperature range, and wherein the control section is configured to compute a temperature of a target on the basis of the output voltage of the first self temperature detecting section, the second self temperature detecting section, or the third temperature detecting section selected by the self temperature detecting section selector, and the target temperature detected by the thermopile.

5. The non-contact temperature sensing device according to claim 4, wherein the first temperature range is –5° C.≦the estimated ambient temperature SQt<28° C., the second temperature range is 28° C.≦the estimated ambient temperature SQt<57° C., and the third temperature range is 57° C.≦the estimated ambient temperature SQt<80° C.

6. A method of non-contact temperature sensing comprising:

detecting a target temperature using a thermopile;

estimating an ambient temperature at the periphery of the thermopile and computing an estimated ambient temperature with reference to the target temperature;

detecting an ambient temperature at the periphery of the thermopile using each of a plurality of self temperature detecting sections and outputting the detected ambient temperatures at an output voltage of a rate with respect to a total output voltage value which corresponds to the estimated ambient temperature; and switching the self temperature detecting sections according to the estimated ambient temperature.

7. The method according to claim 6, wherein the self temperature detecting sections include:

a first self temperature detecting section configured to output an output voltage which is 20% or higher of the total output voltage when the estimated ambient temperature is in a first temperature range; and a second self temperature detecting section configured to output an output voltage which is 20% or higher of the total output voltage when the estimated ambient temperature is within a second temperature range different from the first temperature range, wherein the switching the self temperature detecting sections includes selecting the first self temperature detecting section when the estimated ambient temperature is within the first temperature range and selecting the self second temperature detecting section when the estimated ambient temperature is within the second temperature range, and wherein the computing includes computing a temperature of a target on the basis of the output voltage of the first self temperature detecting section or the second self temperature detecting section selected by the switching, and the target temperature detected by the thermopile.

8. The method according to claim 6, wherein the thermopile comprises a thermopile temperature sensor configured to detect a temperature by utilizing a red infrared ray.

9. The method according to claim 6, wherein the self temperature detecting sections include:

a first self temperature detecting section configured to output an output voltage which is 20% or higher of the total output voltage when the estimated ambient temperature is in a first temperature range;

a second self temperature detecting section configured to output an output voltage which is 20% or higher of the total output voltage when the estimated ambient temperature is within a second temperature range different from the first temperature range; and a third self temperature detecting section configured to output an output voltage which is 20% or higher of the total output voltage when the estimated ambient temperature is within a third temperature range different from the first temperature range and the second temperature range, wherein the switching the self temperature detecting sections includes:

selecting the first self temperature detecting section when the estimated ambient temperature is within the first temperature range;

selecting the second self temperature detecting section when the estimated ambient temperature is within the second temperature range; or selecting the third self temperature detecting section when the estimated ambient temperature is within the third temperature range, and wherein the computing includes computing a temperature of a target on the basis of the output voltage of the first self temperature detecting section, the second self temperature detecting section, or the third self temperature detecting section selected by the switching, and the target temperature detected by the thermopile.

10. The method according to claim 9, wherein the first temperature range is –5° C.≦the estimated ambient temperature SQt<28° C., the second temperature range is 28° C.≦the estimated ambient temperature SQt<57° C., and the third temperature range is 57° C.≦the estimated ambient temperature SQt<80° C.

* * * * *